Jan. 29, 1963    M. A. VOTOLATO    3,075,304
EDUCATIONAL APPARATUS
Filed April 5, 1961    2 Sheets-Sheet 1

— YELLOW —

— VIOLET —

— BLUE —

— GREEN —

— RED —

— ORANGE —

INVENTOR.
MICHAEL A. VOTOLATO
BY
Kenway, Jenney + Hildreth
ATTORNEYS

Jan. 29, 1963  M. A. VOTOLATO  3,075,304
EDUCATIONAL APPARATUS

Filed April 5, 1961  2 Sheets-Sheet 2

INVENTOR.
MICHAEL A. VOTOLATO
BY
Kenway, Jenney + Hildreth
ATTORNEYS

United States Patent Office

3,075,304
Patented Jan. 29, 1963

3,075,304
EDUCATIONAL APPARATUS
Michael A. Votolato, 11 Lillian Ave., Providence, R.I.
Filed Apr. 5, 1961, Ser. No. 100,958
9 Claims. (Cl. 35—69)

This invention relates in general to educational devices and in particular to magnetic components for the formation of characters.

A great many toys and other articles have been developed for the dual purposes of entertaining and educating children. In some instances, various pieces are provided to be assembled into a doll, or a toy vehicle, or simply a geometrical figure. Usually the pieces are brightly colored or otherwise designed to attract the interest of children. Many other devices or toys have been marketed to aid children in learning the alphabet, numbers, words, and simple arithmetic. These articles range from blocks on which suitable symbols are inscribed to word-forming games and problem-solving devices.

The present invention is concerned with and has as its primary object the training and education of children in the formation of alphabetical letters, numerical symbols, and simple words.

It is another object of the present invention to entertain and amuse children while training them in the formation of letters, numbers and words.

It is a further object of the present invention to aid children in forming letters and numbers correctly.

It is a still further object of the present invention to discourage the formation by children of misshapen or incorrect letters and numbers.

In general, the invention consists in a number of pieces which contain one or more magnets. The pieces are of various shapes and are made up in groups of pieces of distinctive colors. From any one color group a number of letters or numbers can be made, the same or similar pieces serving as components of one or more letters or numbers.

The magnets in the various pieces are so located and poled that correctly shaped letters are formed almost automatically in the sense that the pieces are attracted one to another in a manner which insures proper formation of the letters and numbers. Conversely, when it is attempted to utilize the wrong component pieces, the repulsion between magnets in the pieces inhibits the formation of misshapen letters or numbers. For a better understanding of the present invention, together with other and further objects, advantages and features, reference should be made to the following detailed description which should be read in conjunction with the appended drawings in which:

Figure 1:
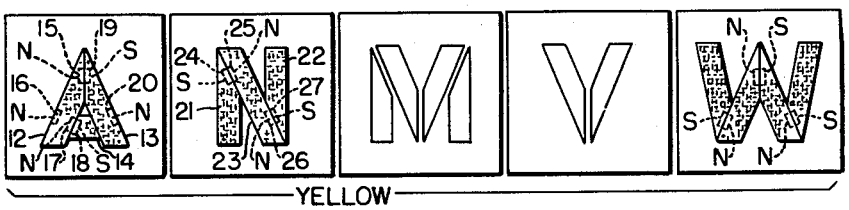
FIG. 1 is a representation of the alphabet as it may be formed from the pieces of the invention.
Figure 1:
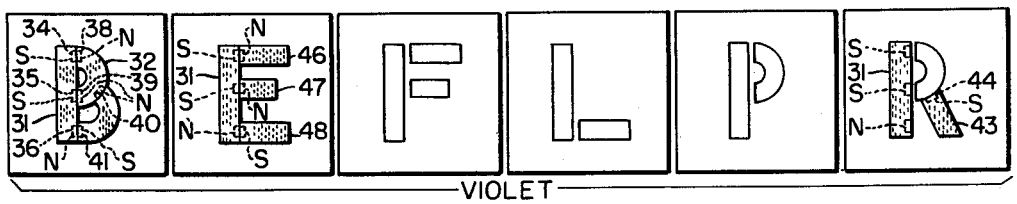
Figure 1:
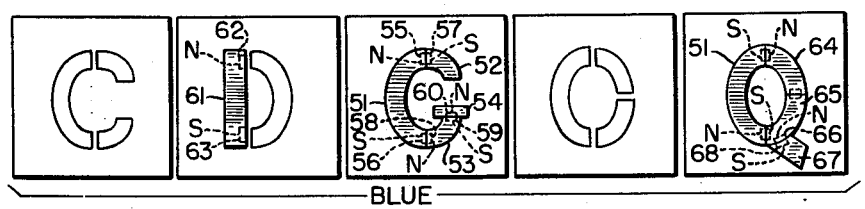
Figure 1:
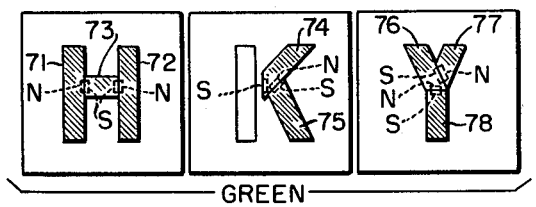
Figure 1:
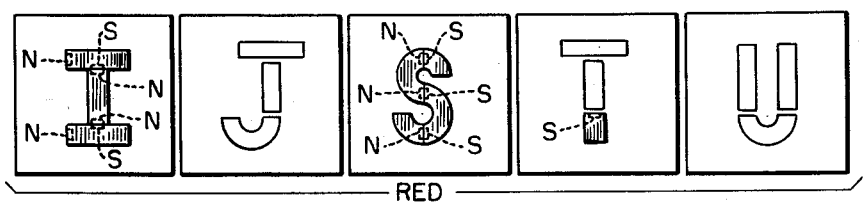
Figure 1:
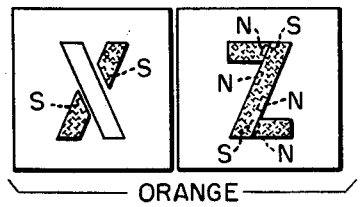

In the drawing the embodiment of the invention shown is limited to alphabetical characters to avoid undue complications. However, it is believed the application of the invention to numerical symbols and word formation is apparent.

In FIG. 1, there are six groups of letters shown. The first group is composed of the letters "A," "N," "M," "V," and "W." Each piece from which the letters of this group are formed is of the same distinctive color, in this instance, yellow. In this embodiment of the invention only enough yellow pieces are provided to form any one of the following groups of letters: AM; ANV; ANW; MV; MW; NVW or VV. The pieces actually provided in this embodiment are indicated by the yellow shading; unshaded pieces are the same pieces being used in alternative configurations. A larger number of pieces might equally well be provided, as for word formation, but the shaded group which is shown permits the formation of the illustrated letters in their proper shape and inhibits the formation of misshapen letters by reason of the presence and polarity of magnets in the various pieces.

In this connection, the letter "A" which is the first letter of the yellow group is made up of a left leg 12, a right leg 13, and a cross-bar 14. There are six magnets disposed in the three pieces. These are the magnets 15, 16, and 17 in the left leg 12, the magnet 18 in the cross-bar 14, and the magnets 19 and 20 in the right leg of the "A." The magnets 15 and 19 are properly poled in the legs of the "A" so that the legs are held together at the top by magnetic attraction. Similarly, the magnet 17 on the inside surface of the lower portion of the left leg 12 is properly poled to attract the magnet 18 in the cross-bar 14 of the "A." The magnets 16 and 20 serve no purpose in this instance.

In the formation of the letter "N," three pieces are used: a left leg 21, a right leg 22, and a slant leg 23. In the left leg 21 a magnet 24 is disposed, and a magnet 25 is suitably placed in the slant leg 23 of the "N" to be attracted by the magnet 24. In the lower portion of the slant leg 23 is another magnet 26 which is suitably located and poled to attract another magnet 27 which is disposed in the right leg of the "N."

If it were attempted by a child to utilize, for example, the left leg 12 of the "A" as the left leg of the "N," a somewhat misshapen letter would be formed. The polarity of the magnets 15 and 25 is such that the left leg of the "A" would be repelled from the slant leg of the "N" because of the repulsion between the like facing poles of the magnets 15 and 25. This situation would also prevail, of course, should it be attempted to utilize either of the legs of the "N" in place of either of the legs of the "A."

Obviously, the letter "V" and the central portions of the letters "M" and "W" are made up of the same pieces as are the legs of the letter "A." In the case of the "V," nothing more is added. In the case of the "M," two additional legs are provided which are magnetically attracted together in the proper positions to form an upright character. In the case of the "W," the legs which are added diverge from the center elements to form a properly shaped "W."

In the second color group, which might be, for example, violet, there is provided a group of pieces from which may be formed the letters "B," "E," "F," "L," "P" and "R." Enough of the violet pieces are provided so that the following letter groups may be assembled with the available pieces: BE; BF; BL; EP; ER; FP; FR; LF; LP; LL and LR. As in the case of the yellow letters, only the pieces actually provided in this embodiment of the invention are shaded.

In the letter "B" three pieces are used. These include the straight piece 31, a semicircular piece 32 and an arcuate piece 33. In the straight piece 31 a magnet 34 is provided adjacent the upper end, and a magnet 35 is disposed centrally on the same side of the piece as the magnet 34. In addition, a third magnet 36 is disposed adjacent the lower end of the straight piece 31 on the same side of the piece as the magnets 34 and 35. In the semicircular piece 32 magnets 38 and 39 are provided in the ends of the piece, and a third magnet 40 is disposed partway around the curve from one end. In the formation of the "B," only one magnet 41 of the piece 33 is operative;

the magnet 40 being of no significance here. As indicated in the drawing, the polarity of the magnets 34 and 38 is such as to attract the upper end of the semicircular piece 32 into proper position against the upper end of the straight piece 31. The magnets 35 and 39 serve a similar purpose at the center of the straight piece and the lower end of the semicircular piece. The magnet 36 adjacent the lower end of the straight piece 31 is properly located and poled to attract the magnet 41 at the end of the arcuate piece 33 to hold the piece in the proper position to complete the letter "B" in its true formation.

The letter "R" is formed in the same manner as the letter "B," utilizing the straight piece 31 and the semicircular piece 32. However, there is substituted for the arcuate piece 33 a slant leg 43. The slant leg 43 is formed with an arcuate end in which there is disposed a magnet 44, properly disposed and poled to be attracted by the magnet 40 in the semicircular piece 32. The three pieces when assembled form the letter "R," the true shape being assured by the attraction between the various magnets.

The letter "E" also utilizes the straight piece 31 together with three additional straight pieces 46, 47 and 48. The pieces 46 and 48 are of course identical. A magnet is provided in the end of each of the pieces 46, 47 and 48 in the proper location and suitably poled to be attracted to the magnets in the straight piece 31 to form a true letter "E." The additional letters of the violet group, namely "F," "L," and "P," are simply less complicated versions of the other letters of the violet group which have been described in detail.

In the violet group as in the yellow group, the poling of the magnets is such that, for example, a straight piece such as 47 used as the center leg in the letter "E" could not be used as the slant leg of the letter "R" because the magnet 40 in the semicircular piece 32 would repel the magnet of the straight piece 47. It would not ordinarily be attempted to substitute a piece such as the piece 48 for the slant leg of the "R" because of its greater length.

In the third color group, which might for example be blue, pieces are provided to form the letters "C," "D," "G," "O" and "Q." The total number of pieces provided, as indicated by the shading, is sufficient to form at one time any of the following groups of letters: CD; CO; CQ; DG; DO; GO; GQ and DQ. The letter "G" is formed from an elliptical piece 51, two arcuate pieces 52 and 53, and a short straight piece 54. Again, magnets 55 and 56 are provided in the ends of the long elliptical piece 51 properly located and poled to attract the magnets 57 and 58 in the ends of the arcuate pieces 52 and 53, respectively. In addition, a magnet 59 at the other end of the arcuate piece 53 is properly poled and disposed to attract a magnet 60 in the short straight piece 54. The letter "D" is formed by combining a straight piece 61 with the elliptical piece 51, the magnets 62 and 63 adjacent the ends of the straight piece 61 being properly disposed and poled to attract those of the elliptical piece 51. The letter "Q" utilizes the long elliptical piece 51 and two half elliptical pieces 64 and 65. The piece 65 differs from the piece 64 only in that a magnet 66 is provided in the outer periphery of the piece 65. A small piece 67 is provided to form the tail of the "Q," and it includes a magnet 68 which is attracted by the magnet 66 to properly locate the tail of the "Q."

In the fourth color group, which for example may be green, pieces are provided to form the letters "H," "K" and "Y." Enough pieces, as indicated by the shading, may be provided to form the letter groups HY and KY. The letter "H" includes two straight pieces 71 and 72, each of which has a single magnet in its long side offset from the center. The cross-bar of the "H" is formed by a piece 73 having magnets in both its ends. The magnets are suitably poled and disposed to hold the pieces together in a true "H." The letter "K" utilizes a long piece such as 71 or 72 in combination with two slant pieces 74 and 75. Again, the location of the magnets is such as to permit the formation of a properly shaped letter and inhibit the formation of misshapen letters. The letter "Y" includes the pieces 76, 77 and 78. Here too, the proper shape of the letter is assured by the disposition and poling of the magnets contained in each piece.

A fifth color group, red in this instance, includes pieces of the proper shape to form the letters "I," "J," "S," "T" and "U." Enough pieces, as indicated by the shading, may be included in the group to form at any time the letters "IS" or the letters "ST." From the description of the previous groups, the proper assembly of the letters is insured by the suitable location of magnets as may be clearly seen. Suitable straight pieces are included to form the letters "I" and "T," and arcuate piece are provided for the letters "J," "S" and "U" to be used alone as in the case of the "S" or in combination with straight pieces to form the "J" and "U."

Similarly, in the sixth, or orange, group, the letters "X" and "Z" may be formed. The magnets again are properly poled and located to assure correct letter formation.

Figure 2:
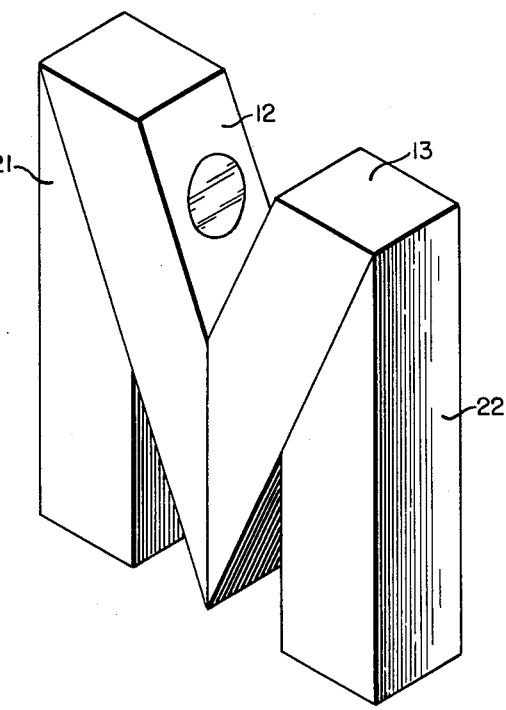
FIG. 2 is a perspective view showing detail of the formation of a single letter.
Figure 2A:
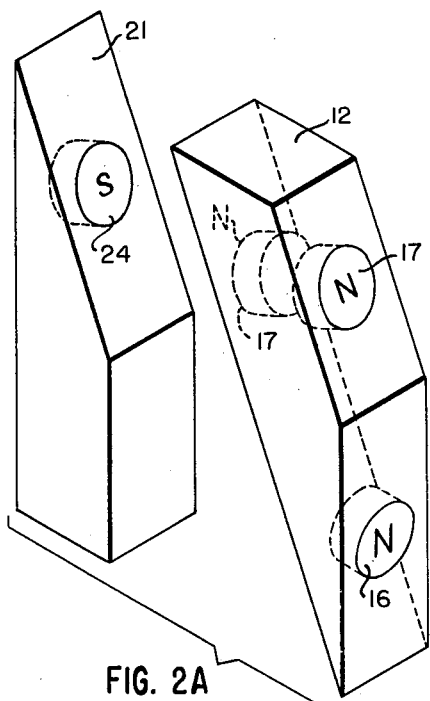
FIG. 2a is an exploded view of the embodiment shown in FIG. 2.

In FIG. 2, the construction of a typical letter is shown in detail. In this instance, it is the letter "M" selected from the first color group. The central portion of the "M" is formed from the pieces 12 and 13, to which are added the pieces 21 and 22. In the exploded view of FIG. 2a, the manner in which the various pieces are attracted together is plainly apparent. The magnet 24 in the piece 21 has an outwardly facing south pole. The magnet 17 in the piece 12 has a north pole facing outwardly to the left, which is of course attracted by the outwardly facing south pole of the magnet 24. The magnet 17 in this instance serves no purpose. However, the magnet 16 has an outer north pole facing to the right which in turn is attracted to the outer south pole of the magnet 19 of the piece 13. The outwardly facing north pole of the magnet 20 in the piece 13 is, in turn, attracted by the outwardly facing south pole of the magnet 27 in the piece 22.

Figure 3:
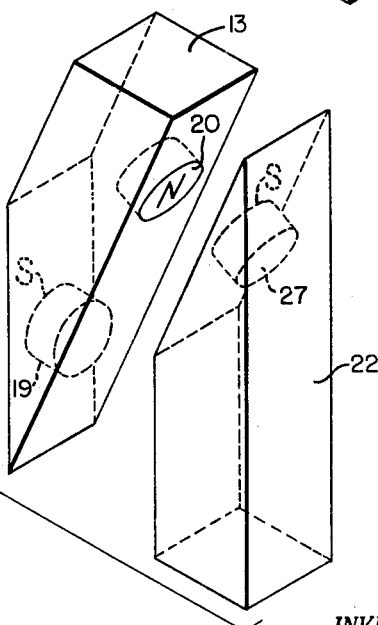
FIG. 3 is a perspective view of a preferred type of magnet such as is disposed in the various pieces.
Figure 3:
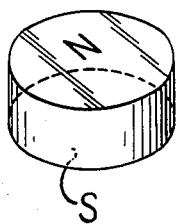

In FIG. 3 a magnet typical of those which are used in the various pieces is shown. It is a simple button type of magnet, made preferably of Alnico or other similar material capable of being strongly magnetized. One face of the button is of one polarity and the other face is, of course, of the opposite polarity.

Although what is disclosed relates primarily to the formation of letters of the alphabet, the same principles are obviously applicable to the formation of numbers or other symbols. Moreover, by varying the number of pieces and the number of groups, the apparatus can be adapted for use as a word-forming game or for simple arithmetical exercises or the like. These and other alternatives will suggest themselves to those skilled in the art upon a reading of the foregoing specification, and the invention should, therefore, not be limited to the exact details disclosed, but only by the spirit and scope of the appended claims.

What is claimed is:

1. Educational apparatus comprising a plurality of pieces and at least one magnetic element carried by each said piece, each piece being shaped to form a constituent part of a plurality of characters and said magnetic elements being so disposed in said pieces as to inhibit formation of improperly shaped characters.

2. Educational apparatus comprising a plurality of pieces and at least one magnetic element disposed within each of said pieces, each piece being shaped to form a constituent part of a plurality of true characters as determined by the relative positions of said magnetic elements in said pieces, said magnetic elements being further disposed within said pieces to repel formation of false characters.

3. Educational apparatus comprising a plurality of pieces and at least one magnetic element disposed within each of said pieces, said magnetic elements being disposed in said pieces to hold said pieces together upon assembly thereof to form constituent portions of a plurality of valid characters and to cause repulsion of one piece by another to prevent formation of invalid characters.

4. Educational apparatus comprising a plurality of pieces and at least one magnetic element disposed within each of said pieces, said magnetic elements being poled and disposed in said pieces to permit formation of true characters by magnetic attraction and to inhibit formation of improperly shaped letters by magnetic repulsion upon assembly of said pieces.

5. An educational alphabet comprising a plurality of pieces and at least a magnetic element carried by each of said pieces, said magnetic elements being poled and disposed in said pieces and said pieces being properly shaped for assembly to form only true letters by magnetic attraction.

6. An educational alphabet comprising a first plurality of pieces made up of distinct groups of said pieces and at least one magnetic element disposed in each of said pieces, each piece being shaped to form a constituent part of a second plurality of true letters, and each distinct group including only those pieces capable of forming certain of the true letters of the alphabet.

7. An educational alphabet as defined in claim 6 wherein said magnetic elements are poled and disposed in said pieces to permit the assembly of said pieces into true letters by magnetic attraction and to inhibit the formation of misshapen letters by magnetic repulsion.

8. An educational alphabet comprising one group of pieces of a first color and at least another group of pieces of a second color, at least one magnet disposed in each of said pieces, each piece of said first color being shaped to form a constituent part of certain of a first plurality of the letters of the alphabet, and each piece of said group of said second color being shaped to form a constituent part of others of a second plurality of letters of the alphabet, said magnets being so poled and disposed as to permit by magnetic attraction assembly of said pieces together to form true letters and to inhibit by magnetic repulsion assembly of said pieces to form misshapen letters.

9. An educational alphabet composed of a plurality of groups of pieces, each said group having a distinctive color, at least one magnetic element disposed within each said piece, said pieces of each group of distinctive color being shaped and having exposed polar surfaces of said magnetic elements to permit the assembly thereof into a plurality of true letters by magnetic attraction, the total of letters capable of being formed by pieces of all of said groups constituting the entire alphabet.

References Cited in the file of this patent

UNITED STATES PATENTS

| | | |
|---|---|---|
| 2,570,625 | Zimmerman et al. | Oct. 9, 1951 |
| 2,682,118 | Larsen | June 29, 1954 |
| 2,935,936 | Woodring et al. | May 10, 1960 |

FOREIGN PATENTS

| | | |
|---|---|---|
| 1,076,940 | France | Apr. 28, 1954 |
| 316,111 | Italy | Mar. 21, 1934 |